US010480680B2

(12) United States Patent
McCartney et al.

(10) Patent No.: US 10,480,680 B2
(45) Date of Patent: Nov. 19, 2019

(54) TAMPER RESISTANT LOCKING DEVICE FOR FIRE HYDRANT

(71) Applicants: Jock Alston McCartney, Coral Springs, FL (US); John Alston McCartney, Coral Springs, FL (US); Curtis Onsager, Palm City, FL (US); Andrew Henninger, Palm City, FL (US)

(72) Inventors: Jock Alston McCartney, Coral Springs, FL (US); John Alston McCartney, Coral Springs, FL (US); Curtis Onsager, Palm City, FL (US); Andrew Henninger, Palm City, FL (US)

(*) Notice: Subject to any disclaimer, the term of this patent is extended or adjusted under 35 U.S.C. 154(b) by 0 days.

(21) Appl. No.: 16/235,520

(22) Filed: Dec. 28, 2018

(65) Prior Publication Data

US 2019/0249796 A1  Aug. 15, 2019

Related U.S. Application Data

(60) Provisional application No. 62/631,153, filed on Feb. 15, 2018.

(51) Int. Cl.
| *F16K 35/10* | (2006.01) |
| *E05B 65/00* | (2006.01) |
| *E03B 9/06* | (2006.01) |
| *E05B 73/00* | (2006.01) |
| *F16K 35/06* | (2006.01) |
| *F16K 27/12* | (2006.01) |

(52) U.S. Cl.
CPC .......... *F16K 35/10* (2013.01); *E03B 9/06* (2013.01); *E05B 65/006* (2013.01); *E05B 73/00* (2013.01); *F16K 35/06* (2013.01); *F16K 27/12* (2013.01)

(58) Field of Classification Search
CPC ...... E05B 65/00; E05B 65/001; E05B 65/006; E05B 65/0089; E05B 73/00; E05B 73/007; E05B 73/0076; F16K 35/00; F16K 35/06; F16K 35/10
See application file for complete search history.

(56) References Cited

U.S. PATENT DOCUMENTS

| 1,832,057 | A | * | 11/1931 | Stein .................. B60K 15/0409 |
| | | | | 70/164 |
| 4,033,372 | A | | 7/1977 | Bowman |
| 4,484,595 | A | | 11/1984 | Vanek et al. |
| 4,566,481 | A | | 1/1986 | Leopold, Jr. et al. |
| 4,620,428 | A | | 11/1986 | Kopesky |

(Continued)

*Primary Examiner* — Christopher J Boswell
(74) *Attorney, Agent, or Firm* — Dunlap Bennett & Ludwig PLLC; Brendan E. Squire

(57) ABSTRACT

A tamper resistant locking device for securing fire hydrants. The device is simple to install, easy to remove by the fire department using securing fasteners commonly available. The locking device prevents unauthorized use of a fire hydrant. A collar assembly is dimensioned to encircle a barrel of a fire hydrant. A tab protrudes from ends of the collar assembly each having at least one slot. A retainer leg has an aperture dimensioned to receive an operating nut of the fire hydrant. A bottom end of the retainer leg is oriented to be received in the coaxially aligned slot of the collar assembly, such that the aperture prevents rotation of the operating nut.

11 Claims, 4 Drawing Sheets

(56) References Cited

U.S. PATENT DOCUMENTS

| | | | |
|---|---|---|---|
| 4,681,134 A * | 7/1987 | Paris, Sr. | F16K 35/10 137/382 |
| 4,727,900 A | 3/1988 | Dooling et al. | |
| 4,736,765 A | 4/1988 | Campbell | |
| 5,238,141 A * | 8/1993 | Callegari | F17C 13/002 137/382 |
| 5,303,961 A | 4/1994 | Popil | |
| 5,353,833 A * | 10/1994 | Martinez | F16K 35/10 137/385 |
| 5,469,724 A | 11/1995 | Pollard | |
| 5,549,133 A | 8/1996 | Sigelakis | |
| 5,613,386 A * | 3/1997 | Mire, Sr. | B63H 5/165 70/18 |
| 6,123,098 A * | 9/2000 | Gremillion, III | F16K 35/10 137/377 |
| 6,463,953 B1 * | 10/2002 | Cuzzo | E03B 9/06 137/296 |
| 6,688,326 B1 | 2/2004 | Sigelakis | |
| 6,691,732 B2 * | 2/2004 | Fleury, Jr. | E03B 9/06 137/296 |
| 6,692,045 B1 * | 2/2004 | McCall, Jr. | B65D 55/14 292/281 |
| 6,802,338 B1 | 10/2004 | Istre, Jr. | |
| 6,994,106 B1 | 2/2006 | Hackley et al. | |
| 8,353,309 B1 | 1/2013 | Embry et al. | |
| 8,893,534 B1 | 11/2014 | Niemi | |
| 9,315,973 B2 | 4/2016 | Varman et al. | |
| 2003/0024284 A1 * | 2/2003 | Erickson | F16K 35/06 70/177 |
| 2010/0276009 A1 | 11/2010 | Wilber et al. | |
| 2010/0319416 A1 * | 12/2010 | Eller, Jr. | F16K 35/06 70/164 |

\* cited by examiner

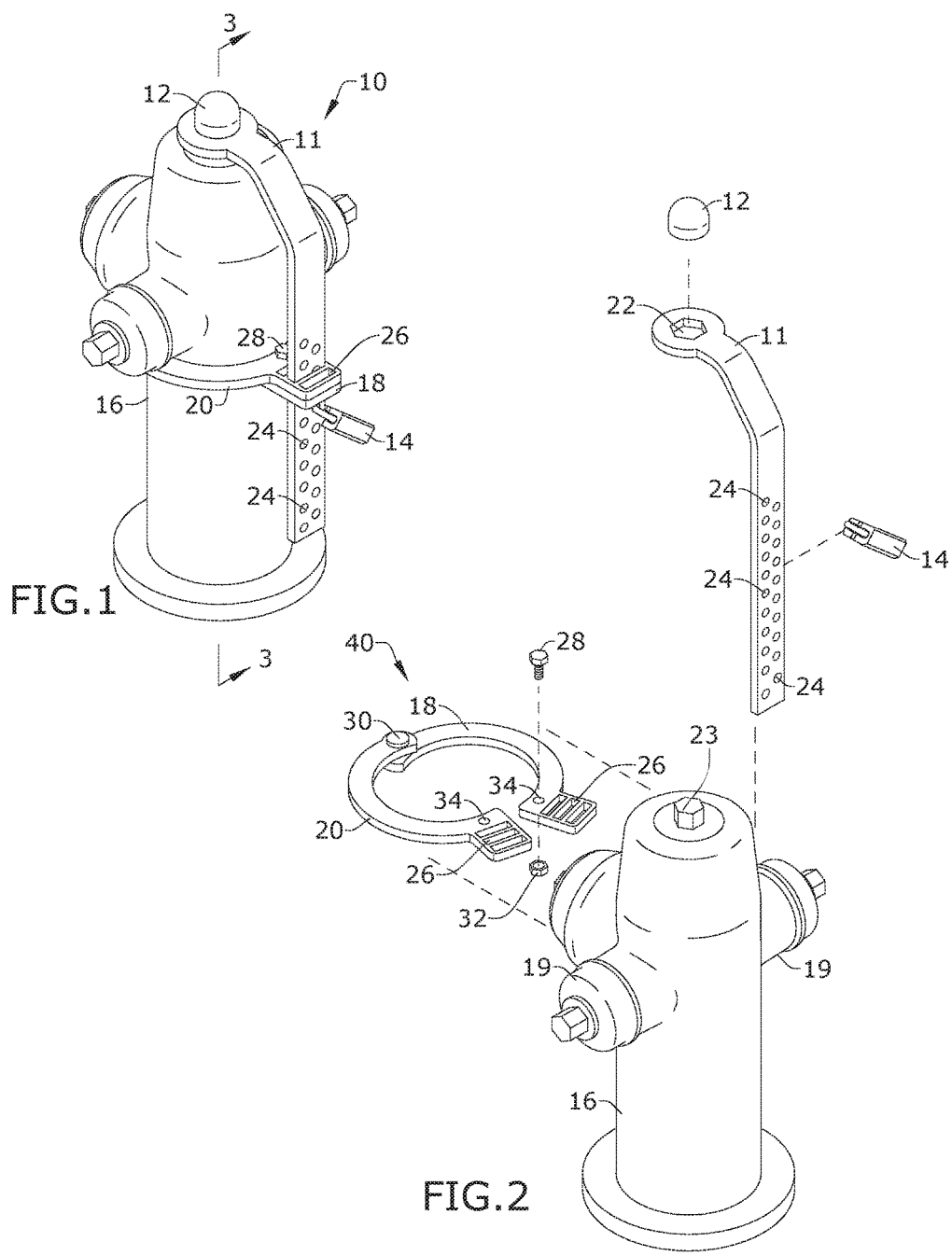

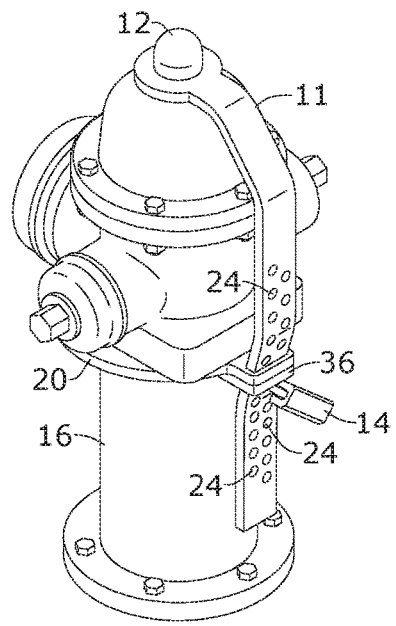
FIG.4
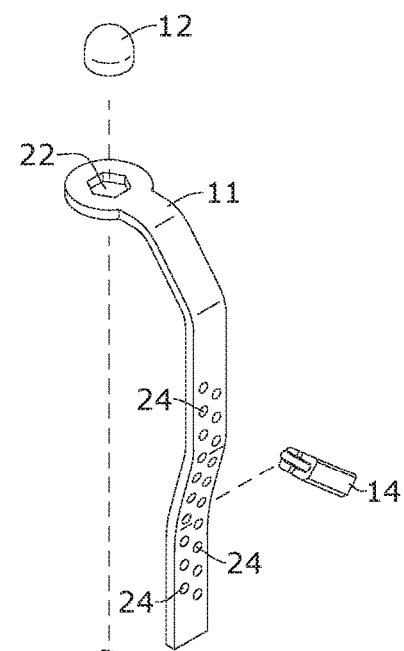
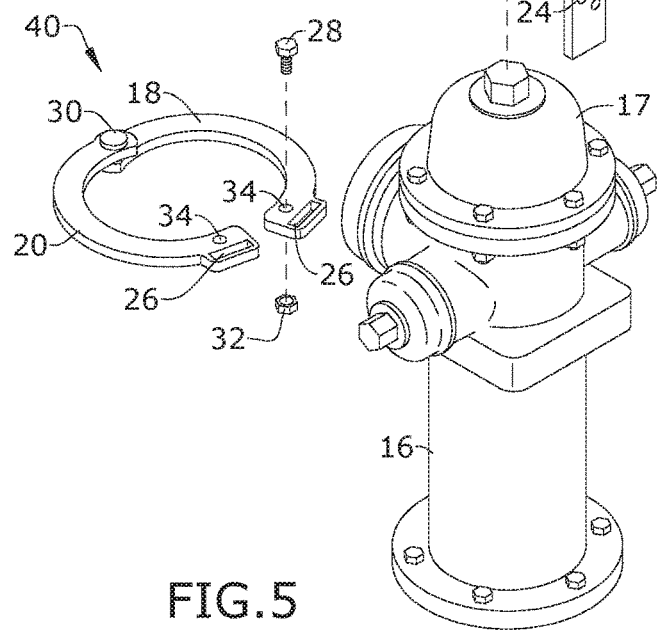
FIG.5

TAMPER RESISTANT LOCKING DEVICE FOR FIRE HYDRANT

CROSS-REFERENCE TO RELATED APPLICATION

This application claims the benefit of priority of U.S. provisional application No. 62/631,153, filed Feb. 15, 2018, the contents of which are herein incorporated by reference.

BACKGROUND OF THE INVENTION

The present invention relates to fire hydrants, and more particularly to locking mechanisms for fire hydrants.

It is not uncommon for municipalities or other entities to secure the water delivery valve of a fire hydrant in order to ensure sufficient pressure and volume is available in the water supply lines to fight a fire. In other circumstances, these entities may secure the water delivery valve of a fire hydrant in order to prevent the insertion of contaminants into the drinking water or theft of the drinking water, or damage to utility pipe network. While there are many other locking devices in the art, they may require modifications to the hydrant, be easily defeated with commonly available tools or are not readily removed by fire fighters when the need arises.

A first example of a fire hydrant locking device is disclosed in U.S. Pat. No. 4,736,765. A hydrant securing device is adapted for use on a conventional fire hydrant having an exposed upper valve nut and a pair of caps each formed with a cap nut. The device preferably comprises a one-piece steel yoke having a generally U-shaped configuration dimensioned for seating directly on the valve and cap nuts. The yoke has a generally horizontal base formed with an opening dimensioned for location about the valve nut, and a pair of downwardly-directed arms, each arm having an opening dimensioned for location about one of the cap nuts. The openings conform generally to the shape of the nuts and prevent rotation of the nuts relative to the yoke so that the caps cannot be removed and water flow cannot be initiated. The yoke is sufficiently resilient that the arm portions can be elastically separated to permit simultaneous location of the openings about the valve and cap nuts and to permit removal of the hydrant securing device in the event of a fire. Each arm has a strap guide formed by displacing a portion of metal from the associated arm to define a passage between the metal portion and the associated arm. A steel strap clamp is extended through the strap guide passages and crimped to prevent separation of the yoke arms and removal of the device. The strap clamp is snapped with a wrench or other prying tool when access to the hydrant is required.

A second example of a fire hydrant locking device is disclosed in U.S. Pat. No. 5,549,133. A security device and system for preventing unauthorized access to and operation of fire hydrants. The security device includes a first end portion for coupling the device to a portion of a fire hydrant. The first end portion preferably is coupled to the hydrant by clamping in between an outlet port of the hydrant and a cap for covering the outlet port. A second end portion covers a valve control device of the hydrant to control access to the valve control device and thereby prevent unauthorized persons from activating it. An intermediate portion integral with the first and second end portions extends vertically from the first end portion to the second end portion. The system for preventing unauthorized operation of a fire hydrant includes the security device described above, a bonnet for protecting a valve control device of the hydrant, and a locking cap for closing an outlet port of the hydrant. The system also may include a tool for removing the locking cap from the outlet port and for opening the valve control device.

A third example of a fire hydrant locking device is disclosed in U.S. Pat. No. 5,469,724. The fire hydrant locking device has a cap enclosing the operating nut of the fire hydrant. The cap is secured in place on the top surface of the fire hydrant bonnet by at least one arm extending downwardly over and about the bonnet and extending beyond the fire hydrant barrel mounting flange. The lower end of the arm is attached to the flanges of the barrel and bonnet by bracket and its pad lock so that the cap, arm, and bonnet of the fire hydrant cannot be removed without first removing the fire hydrant locking device. Another locking bracket is received on the outlet cap, of the fire hydrant hose outlets. Chain is passed through each locking bracket encircling the fire hydrant, whereupon the ends of the chain are pad locked together.

As can be seen, there is a need for an improved tamper resistant locking device for a fire hydrant that is simple to install, easy to remove by the fire department using securing fasteners commonly available.

SUMMARY OF THE INVENTION

In one aspect of the present invention a fire hydrant locking device is disclosed. The fire hydrant locking device includes a collar assembly, which has a pair of arcuate arms pivotally disposed and dimensioned to encircle a barrel of a fire hydrant. A tab protrudes from ends of the arcuate arms. The tab has at least one slot that are coaxially aligned with the collar assembly in a closed position. A retainer leg has an aperture in a top end thereof. The aperture is dimensioned to receive an operating nut of the fire hydrant. A bottom end is substantially orthogonal to the top end, such that with the aperture secured to the operating nut of the fire hydrant, the bottom end is oriented to be received in the at least one slot of the collar assembly.

At least one locking aperture is defined in the bottom end of the retainer leg.

The at least one locking aperture is positioned to receive a securing fastener subjacent to the collar assembly. The at least one locking aperture may include a plurality of locking apertures defined in a spaced apart relation along the bottom end of the retainer leg. The retainer leg may also include an intermediate section having one or more bends to provide a lateral clearance from the aperture and a side of the fire hydrant barrel.

In some embodiments, a hole is defined in each of the arcuate arms, such that in the closed position the hole is coaxially aligned to receive a fastener to secure the collar assembly about the barrel of the fire hydrant. A protective cap may be attached to a top end of the retainer leg, with the protective cap dimensioned to receive the operating nut therein.

In other aspects of the invention, a method of securing an operating nut of a fire hydrant is disclosed. The method includes applying a collar assembly about a barrel of the fire hydrant. The collar assembly comprises pivotally disposed arcuate arms dimensioned to encircle the barrel of the fire hydrant. The method also includes applying a retainer leg between the operating nut and the collar assembly, wherein a top end of the retainer leg has a locking aperture dimensioned to receive the operating nut and a bottom end of the retainer leg is received in a slot defined in an end tab of the arcuate arms. A securing fastener may be applied in a locking aperture defined in the bottom end of the retainer leg, where the locking aperture is subjacent to the collar with the retainer leg applied to the operating nut. The method may also include applying a fastener to secure the arcuate arms in a closed position about the barrel. The collar may be applied beneath a cap of the fire hydrant. Alternatively, the collar may be applied below one or more distribution nozzles, flanges or other features of the fire hydrant.

These and other features, aspects and advantages of the present invention will become better understood with reference to the following drawings, description and claims.

BRIEF DESCRIPTION OF THE DRAWINGS

FIG. 1 is a perspective view of a tamper proof locking collar applied to a fire hydrant.

FIG. 2 is an exploded view of the tamper proof locking collar.

FIG. 4 is an alternative embodiment of the tamper proof locking collar applied to a fire hydrant.

FIG. 5 is an exploded view of the alternative embodiment of the tamper proof locking collar.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provides an improved tamper resistant locking mechanism to secure the operating nut of a fluid delivery valve of a fire hydrant. The device is compatible with most existing fire hydrants and meets both regulatory and operating requirements.

Figure 3:
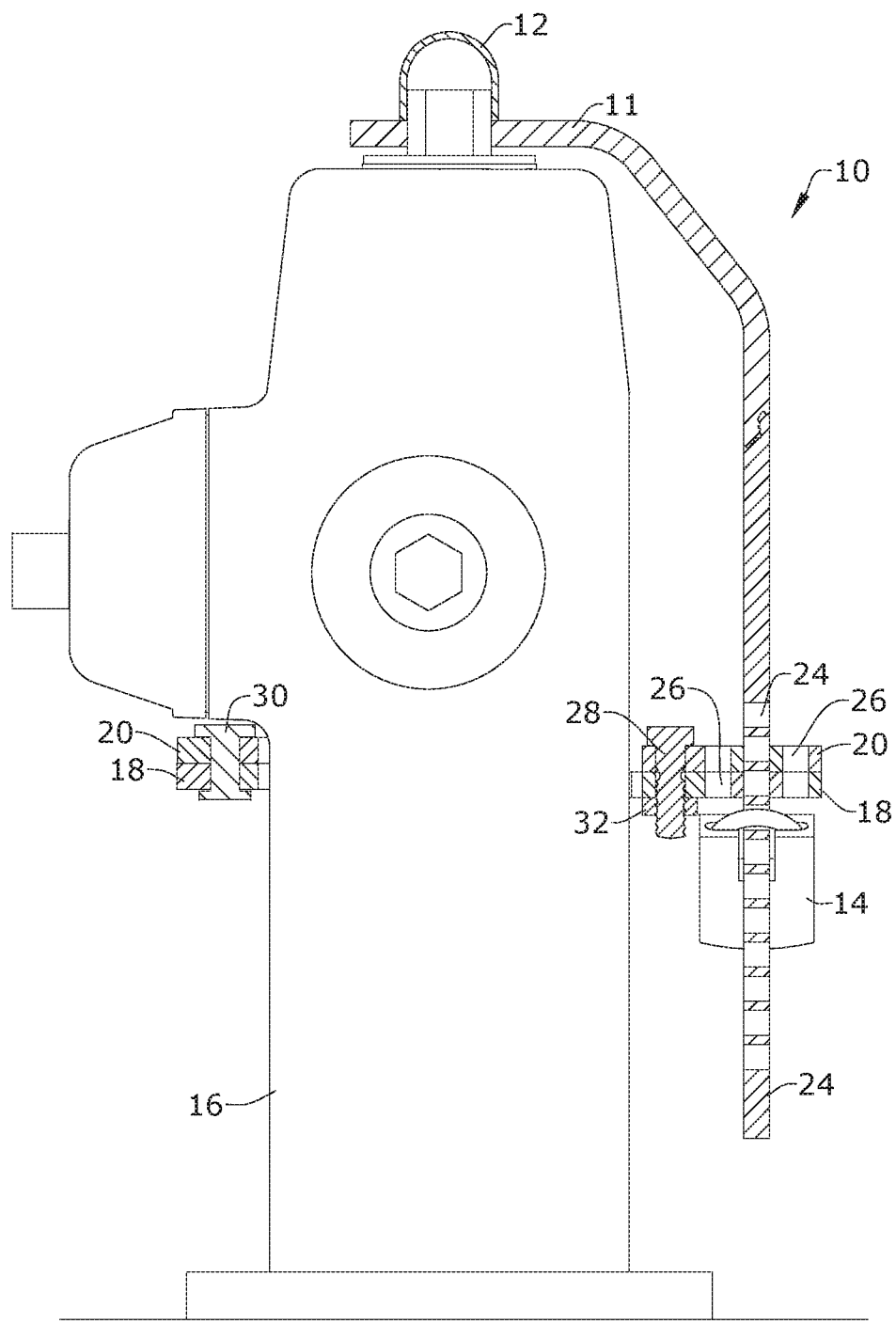
FIG. 3 is a sectional view of the tamper proof locking collar, taken along line 3-3 in FIG. 1.
Figure 6:
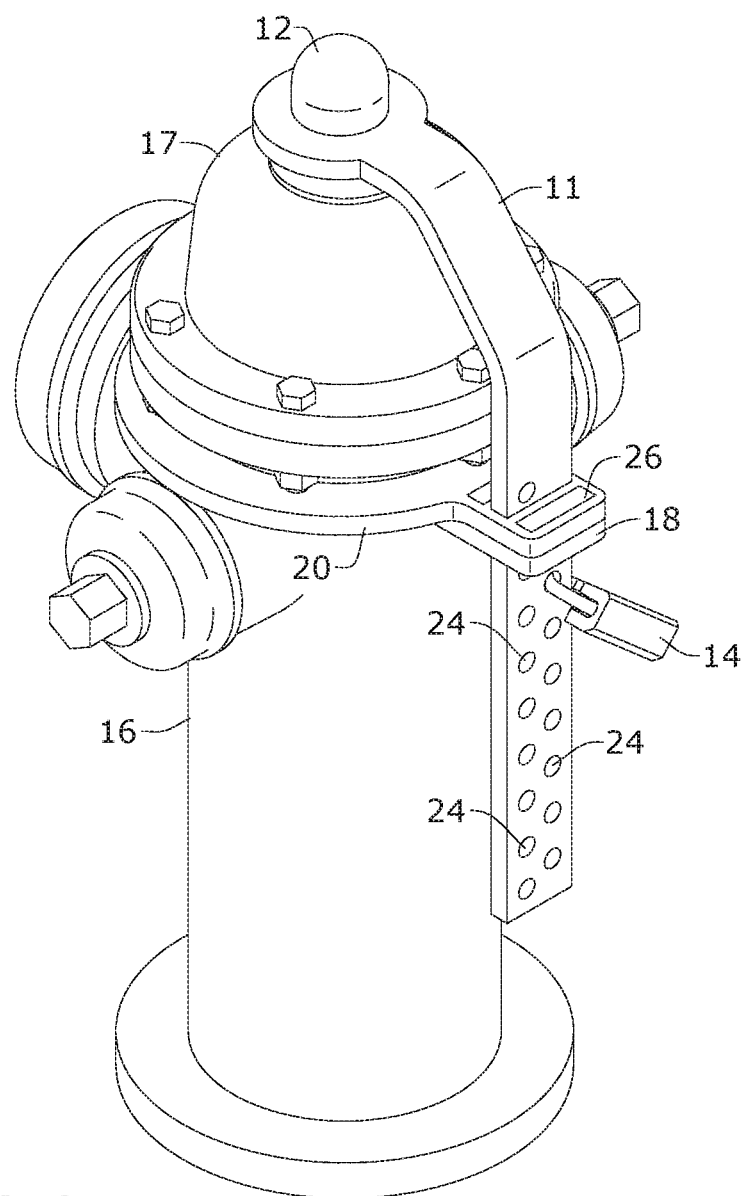
FIG. 6 is a perspective view of a tamper proof locking collar applied to a fire hydrant.

As seen in reference to the drawings of FIGS. 1-3, the tamper resistant fire hydrant locking device 10 of the present invention may include a barrel collar assembly 40 and an operating nut retainer leg 11. The collar assembly 40 is operable between an open condition and a closed condition about a pivot 30, which may be a rivet, pin, bolt, screw or the like. In the open position the arcuate arms 18, 20 of the collar assembly 40 provide sufficient clearance to install and remove the collar from around the hydrant barrel 16. In the closed position, the collar assembly has an internal diameter that is dimensioned to be secured around an outer circumference of a fire hydrant barrel 16 below the hydrant bonnet or cap, as may be seen in reference to FIG. 6. The collar assembly 40 may also be secured below the one or more nozzle outlets 19 of the hydrant 16, such as shown in FIGS. 1 and 4.

The collar assembly 40 includes a pair of tabs protruding from the ends of each of the arcuate arms 18, 20. The tabs having at least one slot 26 defined through the tabs so that the slots 26 may be coaxially aligned when the collar assembly 40 is in the closed position.

A hole 34 may be defined in the arms 18, 20 proximal to the tabs. The hole 34 may receive a fastener 28, such as a nut and a bolt, to secure the arms 18, 20 of the collar assembly 40 around the hydrant 16. The coaxially aligned slots 26 are dimensioned to receive a free end of the nut retainer leg 11 when the locking mechanism 10 is applied to the fire hydrant 16.

A top end of the retainer leg 11 includes an aperture 22 dimensioned to receive the operating nut 23 of the fire hydrant 16. The aperture 22 has an internal geometry that is dimensioned to correspond to a geometry of the operating nut 23. In some embodiments, the aperture 22 has a geometric shaped opening, such as a hexagon, to receive a corresponding geometric shaped head of the operating nut 23 to prevent rotation of the nut 23 with the locking device 10 installed. In other embodiments a protective cap 12 may be installed over the aperture 22 to prevent operation of the operating nut with the decide 10 installed. The protective cap 12 may also prevent the accumulation of ice, paint, and other deleterious elements from interfering with operation of the operating nut 23 when needed to combat fires.

The top end of the retainer leg 11 may extend substantially horizontally to a point clear of the hydrant bonnet or cap 17 and may have one or more bends along a length of the retainer leg 11 to orient the bottom end of the retainer leg 11 in a substantially vertical orientation. An intermediate section of the retainer leg has one or more bends to provide a lateral clearance from the aperture to a side of the fire hydrant barrel 16. The one or more bends may extend the intermediate section around a cap 17 and retaining flanges thereof.

The retainer leg 11 may also include a plurality of locking bores 24 disposed in a spaced apart relation along a lower portion of the retainer leg 11. The locking bores 24 are dimensioned to receive a securing fastener 14 so that the retainer leg 11 is retained in position over the operating nut 23 of the water delivery valve so as to preclude operation of the retainer nut 23 without removing the securing fastener 14 and retainer leg 11.

The securing fastener 14 may include a hasp of a lock, a sealing band, or the like. The securing fastener 14 is positioned through one of the plurality of locking bores 224 subjacent to the cooperating tabs so that the retainer leg 11 is prevented from being lifted vertically clear of the hydrant operating nut 23. Preferably the slots 26 in the collar assembly 40 dimensioned to closely fit and prevent rotation of the retainer leg 11 about a vertical axis of the hydrant 16. Additionally rotation of the retainer leg 11 about the vertical axis is resisted by hydrant protruding hose nozzles 19.

When applied to a fire hydrant 16, the device 10 prevents the operating nut 23 of the water delivery valve from rotation, thereby disabling operation of the hydrant 16. The device 10 may be unlocked by entities possessing access to the lock and securing fastener 14. When the hydrant 16 is needed for use by fire fighters, no delay is experienced by the operators of the hydrant because the distribution nozzles 19 remain accessible for hose connections, permitting one firefighter to connect the hose, while a second fire fighter is able to unlock the device 10 and connect a wrench to the operating nut 23.

The components of the device 10 may be made from steel plate stock and cut out with plasma, laser, water jet cutter or any other means. The device 10 may then be bent to accommodate the profile of the intended model hydrant 16. As will be appreciated, the device 10 could also be used to restrain operation of valves and devices that function in a similar fashion as fire hydrants.

The fire hydrant locking device of this invention provides several advantages over hydrant locking means presently known or in use. A first advantage is the device may be fixed beneath any hydrant protrusion such as outlets, body flange, or cap, making the device available for uniform use in most locations having a variety of fire hydrant types. A further advantage is that no modification or attachment is required to the fire hydrant to facilitate use of the locking device. A further advantage is that the device permits immediate access to the hydrant outlets prior to removal of the device allowing for rapid execution of fire-fighting procedures which require timely attachment of flow control equipment and hoses. Yet an additional advantage is that the hydrant locking device may be manufactured from thick steel or stainless-steel plate making removal by prying or other destructive means unlikely.

A further advantage is that the device is easy to install and remove requiring only three simple steps to install: (1) placement of the articulate arms about the hydrant, (2) insertion of the retainer leg over the operating nut and through the articulated arms slot, (3) Padlock placement and locking. Additionally removal only requires two steps, (1) remove padlock, (2) remove retainer arm.

It should be understood, of course, that the foregoing relates to exemplary embodiments of the invention and that modifications may be made without departing from the spirit and scope of the invention as set forth in the following claims.

What is claimed is:

1. A fire hydrant locking device, comprising:
    a collar assembly, having a pair of arcuate arms pivotally disposed and dimensioned to encircle a barrel of a fire hydrant, a tab protruding from ends of the arcuate arms, the tab each having at least one slot that is coaxially aligned with the collar assembly in a closed position; and
    a retainer leg having an aperture defined in a top end thereof, the aperture having a geometry that is dimensioned to receive a corresponding geometry of an operating nut of the fire hydrant, a bottom end substantially orthogonal to the top end, such that with the aperture secured to the operating nut of the fire hydrant, the bottom end is oriented to be received in the at least one coaxially aligned slot of the collar assembly, wherein the aperture geometry engages with the corresponding geometry of the operating nut to prevent rotation of the operating nut.

2. The fire hydrant locking device of claim 1, further comprising:
    at least one locking aperture defined in the bottom end of the retainer leg, the at least one locking aperture positioned to receive a securing fastener subjacent to the collar assembly.

3. The fire hydrant locking device of claim 2, wherein the at least one locking aperture comprises a plurality of locking apertures defined in a spaced apart relation along the bottom end of the retainer leg.

4. The fire hydrant locking device of claim 3, the retainer leg further comprising:
    an intermediate section having one or more bends to provide a lateral clearance from the operating nut and a side of the fire hydrant barrel.

5. The fire hydrant locking device of claim 4, further comprising:
    a hole defined in each of the arcuate arms, such that in the closed position the hole is coaxially aligned to receive a fastener to secure the collar assembly about the barrel of the fire hydrant.

6. The fire hydrant locking device of claim 4, further comprising:
    a protective cap attached to a top end of the retainer leg, the protective cap dimensioned to receive the operating nut therein.

7. A method of securing an operating nut of a fire hydrant, comprising:
    applying a collar assembly about a barrel of the fire hydrant, the collar assembly comprising pivotally disposed arcuate arms dimensioned to encircle the barrel of the fire hydrant; and
    applying a retainer leg between the operating nut and the collar assembly, wherein a top end of the retainer leg has a locking aperture dimensioned to receive the operating nut and a bottom end of the retainer leg is received in a slot defined in an end tab of the arcuate arms.

8. The method of claim 7, further comprising:
    applying a securing fastener in a locking aperture defined in the bottom end of the retainer leg, wherein the locking aperture is subjacent to the collar with the retainer leg applied to the operating nut.

9. The method of claim 8, further comprising:
    applying a fastener to secure the arcuate arms in a closed position about the barrel.

10. The method of claim 7, wherein the collar is applied beneath a cap of the fire hydrant.

11. The method of claim 7, wherein the collar is applied below one or more distribution nozzles of the fire hydrant.

* * * * *